United States Patent
Duncan

(10) Patent No.: US 10,369,913 B2
(45) Date of Patent: Aug. 6, 2019

(54) SEAT ASSEMBLIES WITH ADJUSTABLE SIDE BOLSTER CUSHIONS

(71) Applicant: Lear Corporation, Southfield, MI (US)

(72) Inventor: Bradley Duncan, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 323 days.

(21) Appl. No.: 15/254,602

(22) Filed: Sep. 1, 2016

(65) Prior Publication Data

US 2018/0056829 A1  Mar. 1, 2018

(51) Int. Cl.
*B60N 2/68* (2006.01)
*B60N 2/90* (2018.01)

(52) U.S. Cl.
CPC .......... *B60N 2/99* (2018.02); *B60N 2/682* (2013.01); *B60N 2/90* (2018.02); *B60N 2/914* (2018.02)

(58) Field of Classification Search
CPC . B60N 2/914; B60N 2/99; B60N 2/90; B60N 2/682
USPC ........................................ 297/284.9
See application file for complete search history.

(56) References Cited

U.S. PATENT DOCUMENTS

| | | | |
|---|---|---|---|
| 5,082,326 A * | 1/1992 | Sekido | B60N 2/914 297/284.6 |
| 7,172,248 B2 | 2/2007 | McMillen et al. | |
| 7,917,264 B2 | 3/2011 | Hozumi et al. | |
| 8,136,883 B2 * | 3/2012 | Rehfuss | B60N 2/986 297/284.9 |
| 8,141,952 B2 | 3/2012 | Poniatowski | |
| 9,145,073 B2 | 9/2015 | Andersson et al. | |
| 9,738,187 B1 * | 8/2017 | McCoy | B60N 2/42718 |
| 2014/0361590 A1 * | 12/2014 | Line | B60N 2/0244 297/284.9 |
| 2015/0351692 A1 | 12/2015 | Pereny et al. | |
| 2016/0229316 A1 * | 8/2016 | Tamura | B60N 2/2222 |

FOREIGN PATENT DOCUMENTS

| | | | |
|---|---|---|---|
| DE | 102013216621 A1 | 2/2015 | |
| EP | 0229737 A2 * | 7/1987 | ............. B60N 2/914 |
| KR | 20100074870 A | 7/2010 | |
| KR | 101440147 B1 | 9/2014 | |
| KR | 101440149 B1 | 9/2014 | |

OTHER PUBLICATIONS

U.S. Appl. No. 14/987,026, filed Jan. 4, 2016; Seat Assemblies With Adjustable Side Bolster Actuators; Applicant: Lear Corporation.

* cited by examiner

*Primary Examiner* — Milton Nelson, Jr.
(74) *Attorney, Agent, or Firm* — Brooks Kushman P.C.

(57) ABSTRACT

A seat assembly is provided with a seat bottom and a seat back extending upright from the seat bottom. At least two side bolster seating surfaces are spaced apart laterally on at least one of the seat bottom and the seat back. A bolster support assembly is provided adjacent each of the two side bolster seating surfaces. Each bolster support assembly has an air bladder and a rigid support mounted to the air bladder and positioned between the side bolster seating surface and the air bladder. When the air bladder is in an inflated position, a contact width of the rigid support along the bolster seating surface is greater than a bladder width.

20 Claims, 3 Drawing Sheets

SEAT ASSEMBLIES WITH ADJUSTABLE SIDE BOLSTER CUSHIONS

TECHNICAL FIELD

The present disclosure relates to adjustable bolster cushions, and in particular to adjustable bolster cushions in a vehicle seat.

BACKGROUND

An adjustable seat assembly is illustrated and described in U.S. Pat. No. 9,145,073, which issued on Sep. 29, 2015 to Lear Corporation.

SUMMARY

In at least one embodiment, a seat assembly is provided with a seat frame for at least one of a seat back and a seat bottom and having two side bolster regions spaced apart laterally on the seat frame. At least two bolster support assemblies are provided, one on each of the two side bolster regions. Each bolster support assembly has an air bladder mounted to the seat frame along each of the side bolster regions and a rigid support attached to the air bladder and not directly attached to the seat frame.

In another embodiment, the rigid support is welded to the air bladder.

In another embodiment, the air bladder has an inner layer and an outer layer sealed along a welded seam to form a chamber, wherein the rigid support is welded to the air bladder along the welded seam.

In another embodiment, the air bladder comprises a double chamber, wherein an inner chamber is mounted to the seat frame, and the rigid support is welded to an outer chamber.

In another embodiment, the rigid support is welded to the air bladder along an outboard portion of the seam adjacent an outboard extension of the rigid support.

In another embodiment, the rigid support is welded to the air bladder along an inboard portion of the seam adjacent an inboard extension of the rigid support.

In another embodiment, the rigid support provides a contact width along a bolster seating surface that is greater than an inflated bladder contact width when the bladder is in an inflated position.

In another embodiment, the rigid support contact width is greater than three times the bladder contact width.

In another embodiment, at least a portion of the contact surface extends outboard from the air bladder.

In another embodiment, the rigid support contact width is at least four times the bladder contact width.

In another embodiment, the rigid support of each of the support assemblies is disposed at an angle defined between the rigid support and the seat frame. When the each of the bladders are in an inflated position, an inflated position angle defined between of the rigid support and the seat frame is greater than an deflated position angle defined between the rigid support and the seat frame.

In at least one other embodiment, a side bolster support assembly is provided with an air bladder having an inner layer adapted to be attached to a seat frame and an outer layer. The inner layer and the outer layer are sealed along a welded seam to form a chamber. The air bladder has a length that is at least twice a bladder width. A rigid support is welded to the air bladder along the welded seam.

In another embodiment, the rigid support has a support width being at least 150% of the bladder width.

In another embodiment, the air bladder comprises an inner chamber and an outer chamber, wherein the rigid support is welded to the weld seam along the outer chamber.

In at least one other embodiment, a seat assembly is provided with a seat bottom and a seat back extending upright from the seat bottom. At least two side bolster seating surfaces are spaced apart laterally on at least one of the seat bottom and the seat back. A bolster support assembly is provided adjacent each of the two side bolster seating surfaces. Each bolster support assembly has an air bladder and a rigid support mounted to the air bladder and positioned between the side bolster seating surface and the air bladder. When the air bladder is in an inflated position, a contact width of the rigid support along the bolster seating surface is greater than a bladder width.

In another embodiment, the rigid support is welded to the air bladder along a weld seam formed adjacent a periphery of the air bladder.

In another embodiment, the rigid support of each of the support assemblies is disposed at an angle relative to each other. When the each of the bladders are in an inflated position, the angle between each of the rigid supports is less than when the bladders are in a deflated position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
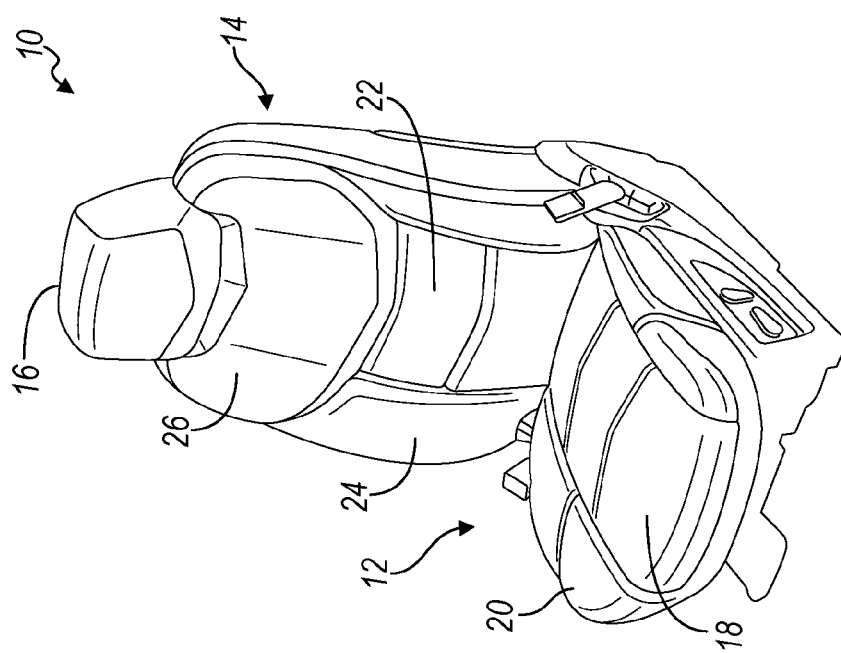
FIG. 1 is a front perspective view of a seat assembly according to an embodiment.
Figure 3:
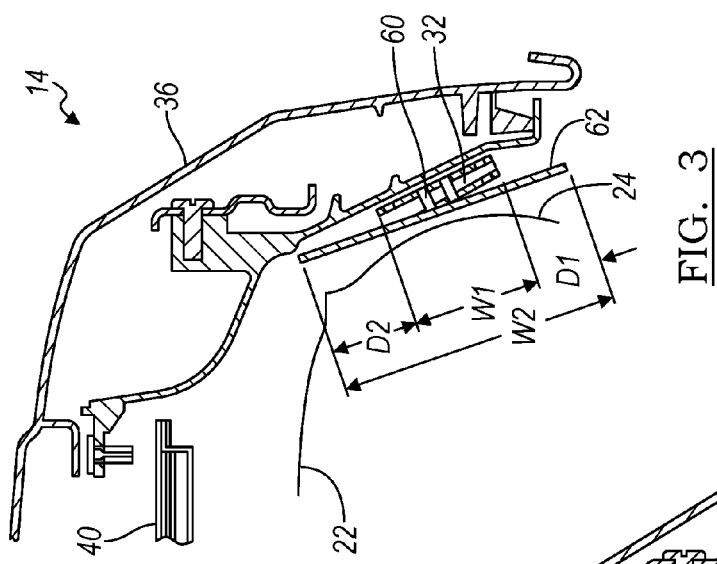
FIG. 3 is a section view of a portion of the seat back of the seat assembly of FIG. 1, illustrating a bolster bladder support assembly according to one embodiment where the side bolster is in a collapsed position.

FIG. 1 illustrates a seat assembly 10 according to an embodiment. The seat assembly 10 may be utilized as a vehicle seat assembly 10 for seating in a vehicle, such as an automobile, an aircraft, a watercraft, or the like. Of course, the seat assembly 10 may be utilized in any seating environment that may benefit from an adjustable seat assembly 10.

The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for motor-driven pivotal adjustment relative to the seat bottom 12. A head restraint 16 may also be mounted for motor-driven adjustable translation to the seat back 14.

The seat bottom 12 includes a central seating surface 18 and a seating surface along a pair of side bolster regions 20 laterally spaced about the central seating surface 18. The seat back 14 includes a pelvic/lumbar seating surface 22 with a pair of laterally spaced apart side bolster regions 24 on either side. A thoracic/shoulder seating surface 26 is provided above the pelvic/lumbar seating surface 22 and the seating surface of seat back side bolster regions 24.

Figure 2:
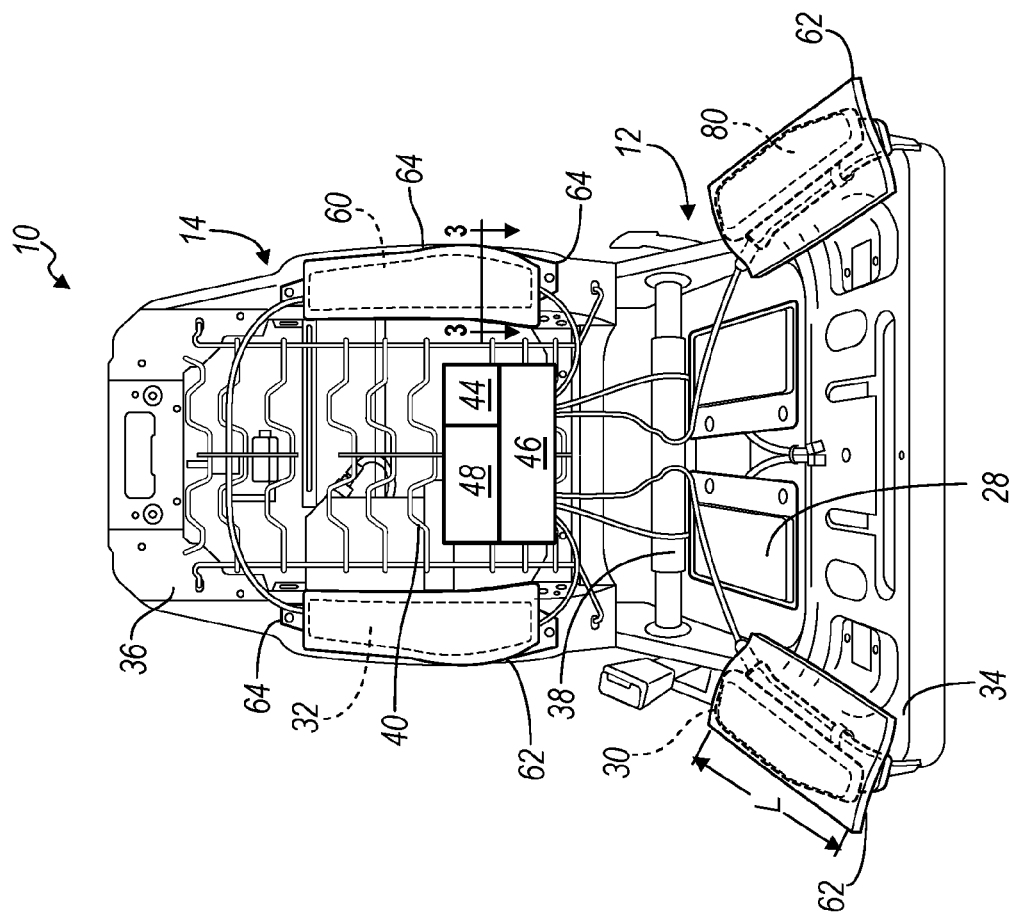
FIG. 2 is a front perspective view of the seat assembly of FIG. 1, according to an embodiment, illustrated partially disassembled.

FIG. 2 illustrates the seat assembly 10 with a cover and trim and foam removed for revealing underlying components. The seat bottom 12 includes a pair of pelvis actuators, such as air bladder assemblies 28 under the central seating surface 18. The seat bottom 12 also includes a pair of side bolster actuators, such as air bladder assemblies 30, each located in one of the seat bottom adjacent the side bolster seating surface 20. Likewise, the seat back 14 includes a pair of side bolster actuators, such as air bladder assemblies 32, each located adjacent one of the seat back side bolster seating surfaces 24. Each of the side bolster air bladder assemblies 30, 32 is supported upon a frame 34, 36 of the corresponding seat bottom 12 and seat back 14. The pelvis air bladder assemblies 28 may be supported upon a suspension 38, which is in turn supported upon the seat bottom frame 34. The seat back 14 also includes a suspension 40. Additional air bladder assemblies may also be provided upon the seat back suspension 40.

The seat assembly 10 provides lateral support to a seated occupant when the vehicle experiences a turn or cornering. In the case of a cornering vehicle, occupant weight is shifted away from the center of its turn. The seat assembly 10 provides support in the seat back 14 and the seat bottom 12 to support the occupant's weight shift away from the center of the vehicle turn. The seat assembly utilizes the pneumatic bladder assemblies 30, 32 in the bolster regions 20, 24 of the seat bottom 12 and the seat back 14, which sense an occupant's weight shift via a change in the internal pressure of the bolster bladder assemblies 30, 32. The seat assembly 10 then inflates the side bolster air bladder assemblies 30, 32 in the seat bottom 12 and/or the seat back 14 to provide lateral support during the cornering event.

The seat assembly 10 also includes compressor 44 provides a source of air to the bladder assemblies 28, 30, 32. A memory control seat module (MCSM) and valve bank are provided on the seat back 14 and identified generally as a controller 46. The controller 46 regulates compressed air into and out of the seat assembly 10. The controller 46 and compressor 44 may be installed in the seat back 14, as shown, or installed under the seat, or anywhere suitable in the vehicle.

The controller 46 may communicate with an interface. The interface may be integrated into the vehicle, such as an instrument panel display that is in suitable wired or wireless communication with the controller 46. The interface may be remote, such as a smart device including phones, tablets and the like, or a smart device application. The remote interface may permit a user to transport settings to each vehicle, such as personal passenger vehicles, airline seating, rental cars, and the like. The smart device application is further described in U.S. patent application Ser. No. 14/560,487 filed on Dec. 4, 2014, which is incorporated in its entirety by reference herein.

The seat assembly 10 may improves an occupant seating position by providing an active pneumatic support that provides lateral support to the occupant in a seated position to correct unbalanced seating conditions caused by turning or cornering of the vehicle. The side bolster air bladder assemblies 30, 32 may be specifically shaped to center an occupant. The active control of the side bolster air bladder assemblies 30, 32 is further described in U.S. patent application Ser. No. 14/987,026 filed on Jan. 4, 2016, which is incorporated in its entirety by reference herein. Each side bolster air bladder assembly 30, 32 can be adjusted individually to achieve an optimum support condition for a variety preferences. The manual and automatic adjustment may be selected via the interface.

FIGS. 3-6 show a section view of the seat assembly 10 along section line 3-3. The side bolster air bladder assembles 30, 32 include an air bladder 60 and a rigid support 62. The air bladder 60 is mounted to the seat frame 34, 36 along each of the side bolster regions 20, 24. The bladder may be mounted to the seat frame 34, 36 at tabs 64 that extend from the periphery of the air bladder 60, as shown in FIG. 2. The rigid support 62 is attached to the air bladder 60 and is not directly attached to the seat frame 34, 36.

The air bladder 60 comprises an inner layer 66 and an outer layer 68 that are sealed together along a welded seam 70. The inner layer 66 and outer layer 68 may be welded together by any suitable plastic welding method such as, sonic welding, heat staking or other known plastic welding methods. The inner layer 66 and outer layer 68 are welded along the periphery to form a chamber 72 and define an inboard weld seam 74 and an outboard weld seam 76, where the inboard weld seam 74 is closer to the central seating surface 18, 22.

Figure 6:
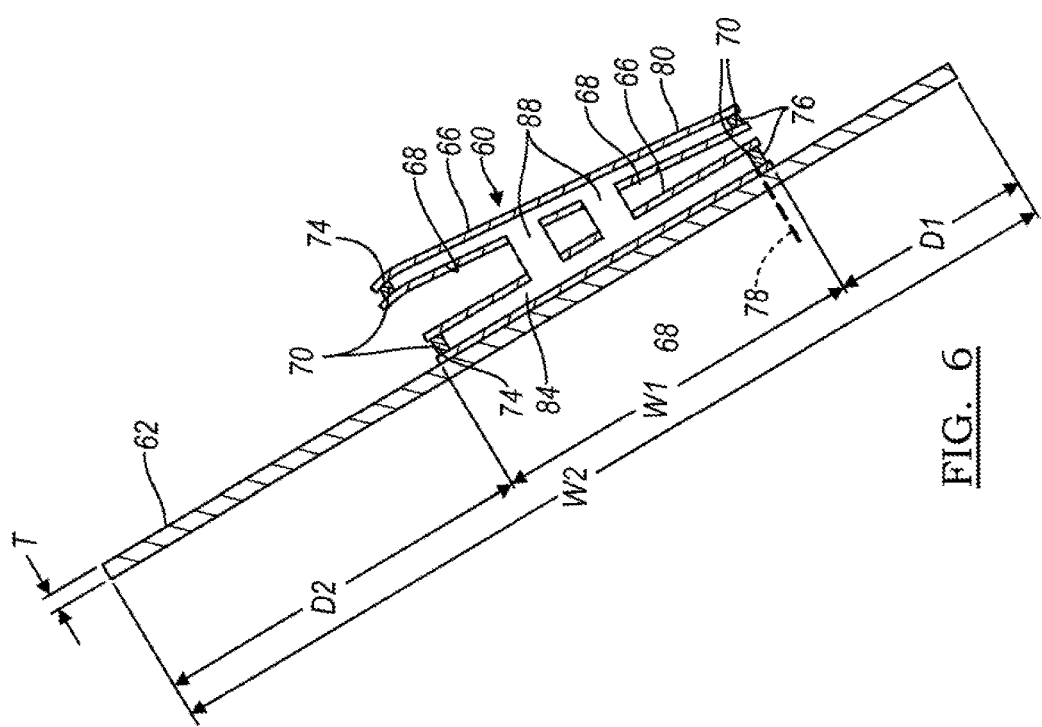
FIG. 6 is a detailed view of the bolster bladder support assembly.

The rigid support 62 is welded to the air bladder 60 at a weld attachment location 78 and is not directly attached to the seat frame 34, 36. The rigid support 62 is welded to the air bladder along the welded seam 70. The weld attachment location 78 and weld seam 70 may be formed in the same process or formed as separate process. As shown in FIG. 6, the rigid support 62 is welded to the air bladder along the outboard weld seam 76.

As shown in FIGS. 1-2, the side bolster seating surfaces 20, 24 are generally long and narrow. The air bladder 60 extends a length L that extends along the seat frame 34, 36 adjacent the side bolster seating surfaces 20, 24. The rigid support 62 has a length generally equal to a bladder length L. In some embodiments, the rigid support 62 may have a length that is longer or slightly shorter than the bladder length L. On the seat bottom 12, the bladder length extends generally in the fore-aft direction. On the seat back 14, the bladder length extends generally in the upright direction.

Figure 4:
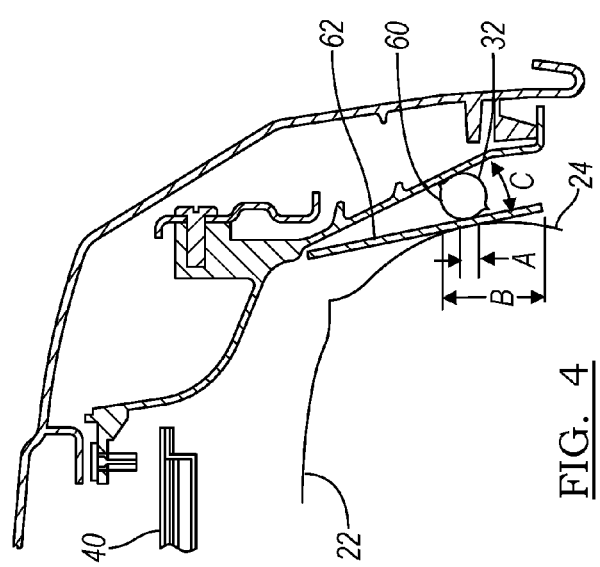
FIG. 4 is a section view of a portion of the seat back of the seat assembly of FIG. 1 and bolster bladder support assembly, where the side bolster is in an inflated position.

The air bladder 60 has a bladder width W1 that is less than the length L. When fully inflated, the natural shape of the air bag 60 is spherical, causing a concentrated region of contact, as shown in FIG. 4 as the contact region A. For example, the bladder alone may only provide a contract region having 10-20 mm of contact length. The rigid support 62 provides a larger contact region B along the seating surface 20, 24 when the air bladder 60 is inflated. For example, the larger contact region provides 60-90 mm of contact length. As such the rigid support 62 has a contact region with a contact width that greater three times the contact width of the air bladder 60 when inflated. In another aspect, the c rigid support 62 has a contact region with a contact width that is at least four times the contact width of the air bladder 60 when inflated.

The air bladder 60 has a width W1, when deflated, of approximately 60 mm. The air bladder 60 may have width W1 of 40-75 mm or other suitable width. The width W2 of the rigid support 62 extends from outboard of the air bladder 60 and extends inboard to a location adjacent frame 34, 36. In at least one embodiment, the rigid support 62 has width W2 of approximately 100 mm. The width W2 may depend on the design and packaging constraints of the seat assembly, among other factors. As such, the width W2 may be in the 80-150 mm. In one embodiment, the width W2 that is at least 150% greater than the width W1 of the air bladder 60.

The rigid support 62 may abut the seat frame 34, 36, but is not directly connected or constrained by the seat frame 34, 36. In at least one embodiment, the width W2 of the rigid support 62 extends outboard of the bladder 60 away from the central seating surface 18, 22. By extending outboard of the bladder 60, the rigid support 62 provides increased contact region B. The contact region B of occupant contact is distributed over a larger area allowing for better comfort for the occupant.

The rigid support 62 may extend outboard of the periphery of the bladder 60 by an outboard distance D1. In one embodiment, the rigid support extends outboard of the bladder 60 by a distance D1 being approximately 10 mm. In another embodiment the rigid support 62 extends outboard of the bladder 60 by a distance of 10-40 mm, depending on the seat assembly design and packaging. In another embodiment, the outboard distance D1 The rigid support 62 may extend inboard of the periphery of the bladder 60 by an inboard distance D2 that is approximately 30 mm. In another embodiment the rigid support 62 extends inboard a distance D2 that is 10-50 mm.

The rigid support 62 may be formed of a plastic sheet. The thickness T of the plastic sheet may depend on the packaging space or amount of support required. For example, the plastic sheet may have a thickness T between 1 mm and 5 mm. The rigid support 62 may be formed of any suitable material. The plastic sheet may be formed of die cut polypropylene and have various thickness depending on the comfort feel required in the seat assembly.

Figure 5:
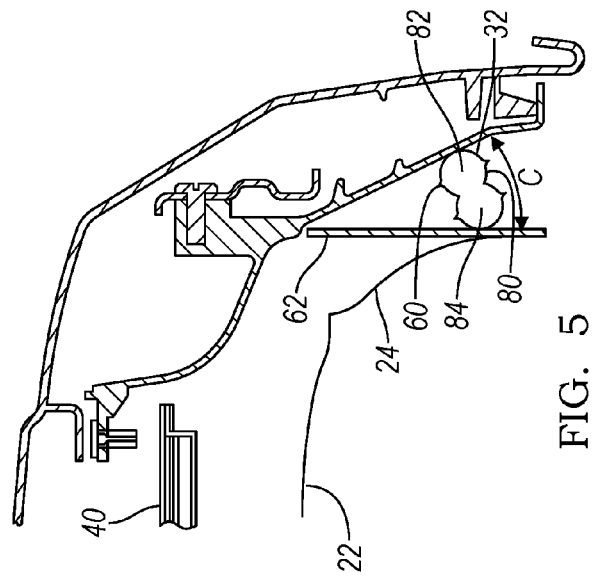
FIG. 5 is a section view of a portion of the seat back of the seat assembly of FIG. 1 and bolster bladder support assembly according to another embodiment, where the side bolster is in an inflated position.

In another embodiment shown in FIGS. 5-6, the side bolster support assembly 30, 32 includes a multi-chambered air bladder 80. The multi-chambered air bladder 80 includes an inner chamber 82 and an outer chamber 84. The inner chamber 82 is attached to the seat frame 34, 36. The outer chamber 84 is positioned adjacent the bolster seating surface 20, 24. The chambers 82, 84 may be generally the same dimensions and have a similar cross-section, as shown in FIG. 5. The multi-chambered bladder 80 provides additional travel distance C when inflated. In the two-chambered bladder shown in the FIG. 5, the bladder 80 may provide approximately 60 mm of travel distance C. In a single chambered bladder, like in FIG. 4, the travel distance C may be approximately 30 mm. However, the amount of travel distance C may vary based on the shape and design of the bladder as well as the number of bladder chambers. The additional travel distance C allows the rigid support 62 to rotate and translate outboard by a greater distance to provide greater support to the occupant. While a bladder with two chambers is illustrated, the multi-chambered bladder may have any number of bladders that are aligned to inflate and provide support along the bolster regions 20, 24.

Each of the chambers 82, 84 are formed with an inner layer 66 and an outer layer 68 that are sealed together along a welded seam 70 as discussed above with regard to the single-chamber bladder 60. The inner chamber 82 is in fluid communication with the outer chamber 84 via a central passage 88. The inner chamber 82 is attached to the seat frame 34, 36. The rigid support 62 is welded to the weld seam 70 along the outer chamber 84.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat frame for at least one of a seat back and a seat bottom;
   at least two side bolster regions spaced apart laterally on the seat frame;
   at least two bolster support assemblies, one provided along each of the two side bolster regions, each bolster support assembly comprising:
   an air bladder mounted to the seat frame along each of the side bolster regions, the air bladder having an inner layer and an outer layer sealed along a welded seam to form a chamber; and
   a rigid support attached to the air bladder and not directly attached to the seat frame, wherein the rigid support is welded to the air bladder along the welded seam.

2. The seat assembly of claim 1 wherein the rigid support is welded to the air bladder along an inboard portion of the seam adjacent an inboard extension of the rigid support.

3. The seat assembly of claim 1 wherein the rigid support of each of the support assemblies is disposed at an angle from the seat frame, wherein when the each of the bladders are in an inflated position, the angle from seat frame is greater than when the bladders are in a deflated position.

4. The seat assembly of claim 1 wherein the air bladder comprises a double chamber, wherein an inner chamber is mounted to the seat frame, and the rigid support is welded to an outer chamber.

5. The seat assembly of claim 1 wherein the rigid support is welded to the air bladder along an outboard portion of the seam adjacent an outboard extension of the rigid support.

6. The seat assembly of claim 1 wherein the rigid support provides a contact width along a bolster seating surface that is greater than an inflated bladder contact width when the bladder is in an inflated position.

7. The seat assembly of claim 6 wherein the rigid support contact width is at least four times the bladder contact width.

8. The seat assembly of claim 6 wherein the rigid support contact width is greater than three times the inflated bladder contact width.

9. The seat assembly of claim 6 wherein at least a portion of the contact width extends outboard from the air bladder.

10. The seat assembly according to claim 1 wherein the air bladder has a length that is at least twice a bladder width.

11. The seat assembly according to claim 10 wherein a width of the rigid support extends outboard from the air bladder.

12. The seat assembly according to claim 10 wherein the air bladder comprises an inner chamber and an outer chamber, wherein the rigid support is welded to the weld seam along the outer chamber.

13. The seat assembly according to claim 10 wherein, the rigid support has a support width being at least 150% of the bladder width.

14. A seat assembly comprising:
a seat bottom;
a seat back extending upright from the seat bottom;
at least two side bolster seating surfaces spaced apart laterally on at least one of the seat bottom and the seat back;
a bolster support assembly provided adjacent each of the two side bolster seating surfaces, each bolster support assembly comprising:
an air bladder having an inner layer and an outer layer sealed along a welded seam to form a chamber; and
a rigid support mounted to the air bladder and positioned between the side bolster seating surface and the air bladder wherein the rigid support is welded to the air bladder along the welded seam,
wherein when the air bladder is in an inflated position, a contact width of the rigid support along the side bolster seating surface is greater than a bladder contact width.

15. The seat assembly of claim 14 wherein the air bladder comprises a double chamber, wherein an inner chamber is mounted to the seat frame, and the rigid support is welded to an outer chamber.

16. The seat assembly of claim 14 wherein the rigid support is welded to the air bladder along at least one of an outboard portion of the seam or an inboard extension of the rigid support.

17. The seat assembly of claim 14 wherein the weld seam is formed adjacent a periphery of the air bladder.

18. The seat assembly of claim 14 wherein at least a portion of the contact width extends outboard of the air bladder.

19. The seat assembly of claim 14 wherein the rigid support contact width is greater than three times the bladder contact width.

20. The seat assembly of claim 14 wherein the rigid support of each of the support assemblies is disposed at an angle relative to each other, wherein when the each of the bladders are in an inflated position, the angle between each of the rigid supports is less than when the bladders are in a deflated position.

* * * * *